Patented July 30, 1929.

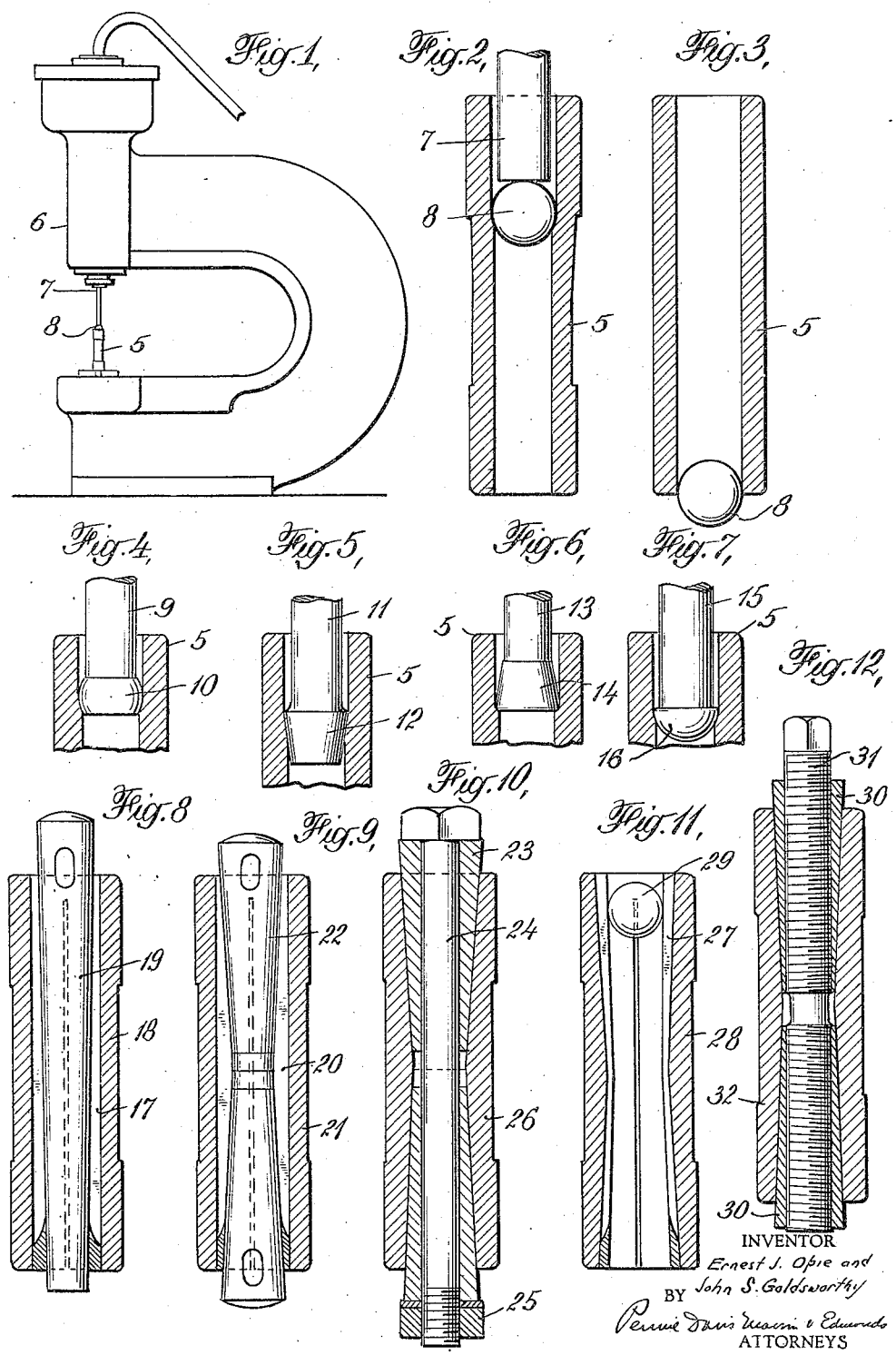

1,722,389

UNITED STATES PATENT OFFICE.

ERNEST JOHN OPIE, OF MENANDS, AND JOHN S. GOLDSWORTHY, OF WATERVLIET, NEW YORK, ASSIGNORS TO M. P. MANUFACTURING COMPANY, OF ALBANY, NEW YORK, A CORPORATION OF DELAWARE.

METHOD OF RECLAIMING WORN PISTON PINS.

Application filed October 19, 1927. Serial No. 227,193.

This invention relates to the reclamation of worn piston pins whereby the normal external dimensions of such pins are restored so that the pins may be used again in place of new pins.

Thousands of worn piston pins are removed annually from internal combustion engines. The wear upon these pins occurs at the outer periphery thereof and consequently the pins cannot be restored by simply machining the outer surface. The worn piston pins have, therefore, no commercial value and they are scrapped. Since such pins are made of high grade steel and are relatively expensive considerable loss results from the scrapping of the pins.

It is the object of the present invention to provide a simple and economical method for the reclaiming of piston pins by restoring them to substantially their original condition and dimensions.

We have discovered that worn piston pins can be reclaimed by subjecting them to expansion so as to force the metal outwardly and enlarging the dimensions sufficiently to permit the machining of the pins to their original and normal dimensions. Piston pins are hollow cylinders of hardened steel. The desired expansion can be accomplished readily by annealing the pins so as to make the metal malleable and by then forcing a tool of suitable form through the hollow pins so that the metal is forced outwardly and the external dimensions are increased accordingly. In carrying out the invention the annealed pin may be placed in a suitable machine adapted to apply pressure to the expanding tool, for example, in an hydraulic press, the external surface of the pin being unconstrained so as to permit the desired expansion. A tool, for example, a hardened steel ball, having a diameter slightly larger than the hole in the pin can then be forced through the hole by pressure applied to the ball while the pin is cold. One or more balls may be used in succession if desired, the balls being of increasing diameter to accomplish the desired amount of expansion.

When the pin has been expanded to the desired extent it is removed from the press and again hardened by heating and quenching in the ordinary manner. The pin may then be ground to the desired size and lapped to a finish. It is then in substantially its original condition and form and is adapted for reuse exactly as a new pin would be used. We have found that the annealing and rehardening of the pin combined with the effect of pressure exerted by the hydraulic or other press has a tendency to refine the texture of the steel so that the quality of the reclaimed pin is actually equal to or better than that of a new pin produced from similar metal.

While we prefer to employ a ball or balls as an expansion tool, other devices of a similar nature can be used. Thus, a tool having a rounded or conical end of larger diameter than the hole in the pin can be forced through the hole by a press. Or suitable split collars may be inserted in the pin and the collar and pin may be expanded then by driving a conical tool into the collar. In place of a single conical tool introduced at one end of the pin two tools may be inserted from opposite ends and forced together by the application of pressure in any suitable way. The pressure may be exerted by a press such as an hydraulic press or a threaded member can be inserted through the tools which may be then forced together by the application of a nut. Similarly, the wedge-shaped tools may be threaded in opposite directions and may be connected by a threaded member so that when the latter is turned the tools are drawn together for the purpose of expanding the pin. These and other equivalent means may be utilized to accomplish the primary purpose of the invention which is the expansion of the pin to increase the external dimensions thereof so as to permit remachining thereof to the dimensions necessary for a finished pin.

The invention will be more fully described with reference to the accompanying drawing in which the preferred forms of apparatus adapted for the practice of the invention are illustrated, it being understood that such illustration is intended merely to indicate more clearly the nature of the invention which is not limited to the use of any specific apparatus. In the drawing, Fig. 1 indicates an hydraulic press with a piston pin supported therein in position to receive the tool which is forced therethrough;

Fig. 2 is a sectional view of a pin illustrating the expansion resulting from the movement of the tool through the pin;

Fig. 3 is a sectional view of the pin at the completion of the expanding operation;

Figs. 4, 5, 6 and 7 are fragmentary views illustrating different forms of tools which may be utilized for the purpose of the invention; and Figs. 8 to 12 inclusive are sectional views illustrating other forms of tools adapted for similar use.

As hereinbefore indicated, the worn piston pin which is made of hardened steel is first annealed by heating it to the necessary temperature from which temperature it is permitted to cool to normal atmospheric temperature. The annealed pin 5 is then mounted in a press comprising a frame or support 6 and a plunger 7, the latter being operated by hydraulic pressure in the usual manner, the pressure available being sufficient to force the tool 8 through the pin. The tool may be a hardened steel ball as indicated in the drawing and it may be engaged by the end of the plunger 7 to permit the application of force. The pin 5 is unconstrained and upon the downward movement of the plunger the ball is carried through the hole therein, causing the metal to flow outwardly, thus enlarging the external dimensions of the pin. The size of the tool employed should be such as to increase the external dimensions to the required degree or another ball of larger dimensions may be forced subsequently through the hole to further expand the metal.

The expanded pin is removed from the press. It is again hardened by heating and quenching in accordance with the usual practice in producing hardened steel articles such as piston pins, and it is then ground to predetermined size and lapped to a finish.

Referring to Fig. 4 of the drawing we may employ in place of a ball a tool having a shank 9 and an enlarged end 10 which is generally spherical in form. This tool may be forced through the pin by the application of pressure exactly as the ball is used in the preceding embodiment of the invention. Similarly as in Fig. 5 the tool may comprise a shank 11 with a conical end 12, the larger dimension of which is sufficient to afford the desired degree of expansion when it is forced through the pin. In Fig. 6 of the drawing the tool comprises a shank 13 with a conical end 14 thereon, the cone being, however, reversed, and in Fig. 7 the shank 15 is provided with a semi-spherical end 16. The several forms of tools may be used in place of the ball and when actuated by pressure in the manner hereinbefore indicated will serve to expand the pin and thus increase its external dimension.

In Fig. 8 a split collar 17 is disposed within a pin 18 and a conical tool 19 is forced therethrough to expand the collar and consequently the piston pin to the desired dimensions. The tool may be actuated by hydraulic pressure or otherwise. Similarly in Fig. 9 a split collar 20 is disposed within the pin 21 and conical tools 22 are forced from opposite ends of the pin into the collar for the purpose of expanding the pin. In Fig. 10 the tools 23 which are conical in form and hollow are connected by a bolt 24 having a nut 25 threaded on the end thereof. By turning the nut the tools may be drawn together for the purpose of expanding the pin 26.

In Fig. 11 a split collar 27 is disposed within the pin 28 and a hardened ball 29 is forced through the collar by hydraulic or other force supplied thereto to expand the pin as in the preceding embodiments of the invention. In Fig. 12 the conical tools 30 are internally threaded and are connected by a threaded member 31, the threads being reversed so that when the threaded member is turned the tools are drawn together to expand the pin 32.

The invention does not depend upon the use of tools of any particular form or upon the application of force provided in any special manner. The purpose of the invention is to increase the external diameter of the worn piston pin by forcing the metal outwardly, thus permitting re-machining of the pin to predetermined dimensions. The expansion of the metal in the manner described improves the quality thereof and consequently the hardness and durability of the pin when the latter has been rehardened and finished. Pins thus reclaimed are, therefore, not only suitable for further use but are actually superior to pins manufactured from similar metal.

As hereinbefore indicated, various changes may be made in the details of the operation and in the apparatus employed without departing from the invention or sacrificing any of its advantages.

We claim :—

1. The method of reclaiming worn piston pins, which comprises annealing the pin, forcing the metal outwardly from the interior thereof to increase the external dimension beyond the normal finished dimension of the pin, rehardening and finishing the pin to the normal dimension.

2. The method of reclaiming worn piston pins, which comprises annealing the pin, subjecting it to internal pressure while the external surface is unconstrained to force the metal outwardly and to increase the external dimension beyond the normal dimension of the pin, rehardening and finishing the pin to the normal dimension.

3. The method of reclaiming worn piston pins, which comprises annealing the pin, forcing the cold metal outwardly from the interior thereof to increase the external dimension beyond the normal finished dimension of the pin, rehardening and finishing the pin to the normal dimension.

In testimony whereof we affix our signatures.

ERNEST JOHN OPIE.
JOHN S. GOLDSWORTHY.